M. L. RIGGS.
VEHICLE SPRING.
APPLICATION FILED JAN. 21, 1919.
1,350,942.
Patented Aug. 24, 1920.
3 SHEETS—SHEET 3.
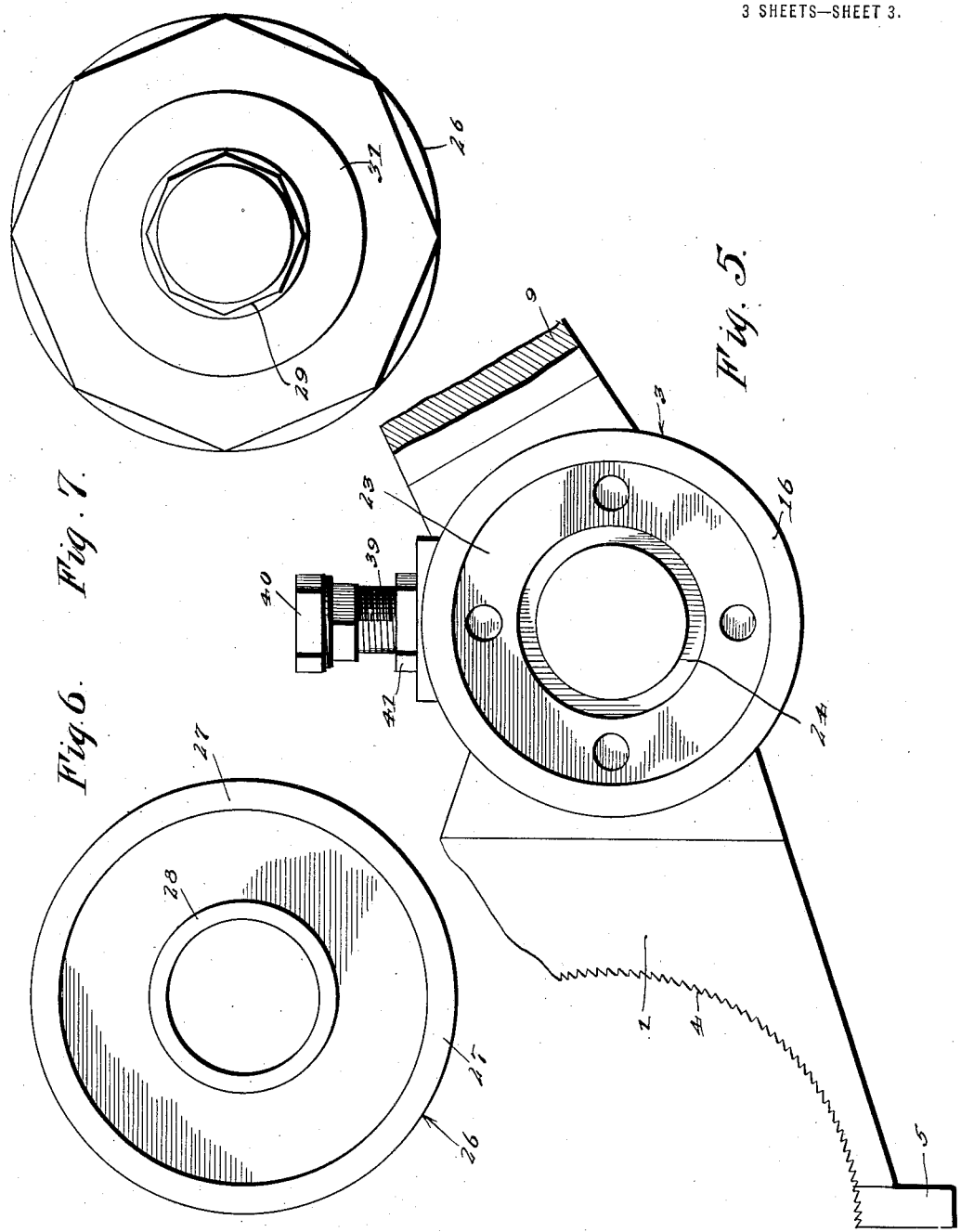
Witnesses
R. A. Thomas
Inventor
M. L. Riggs.
By Victor J. Evans
Attorney

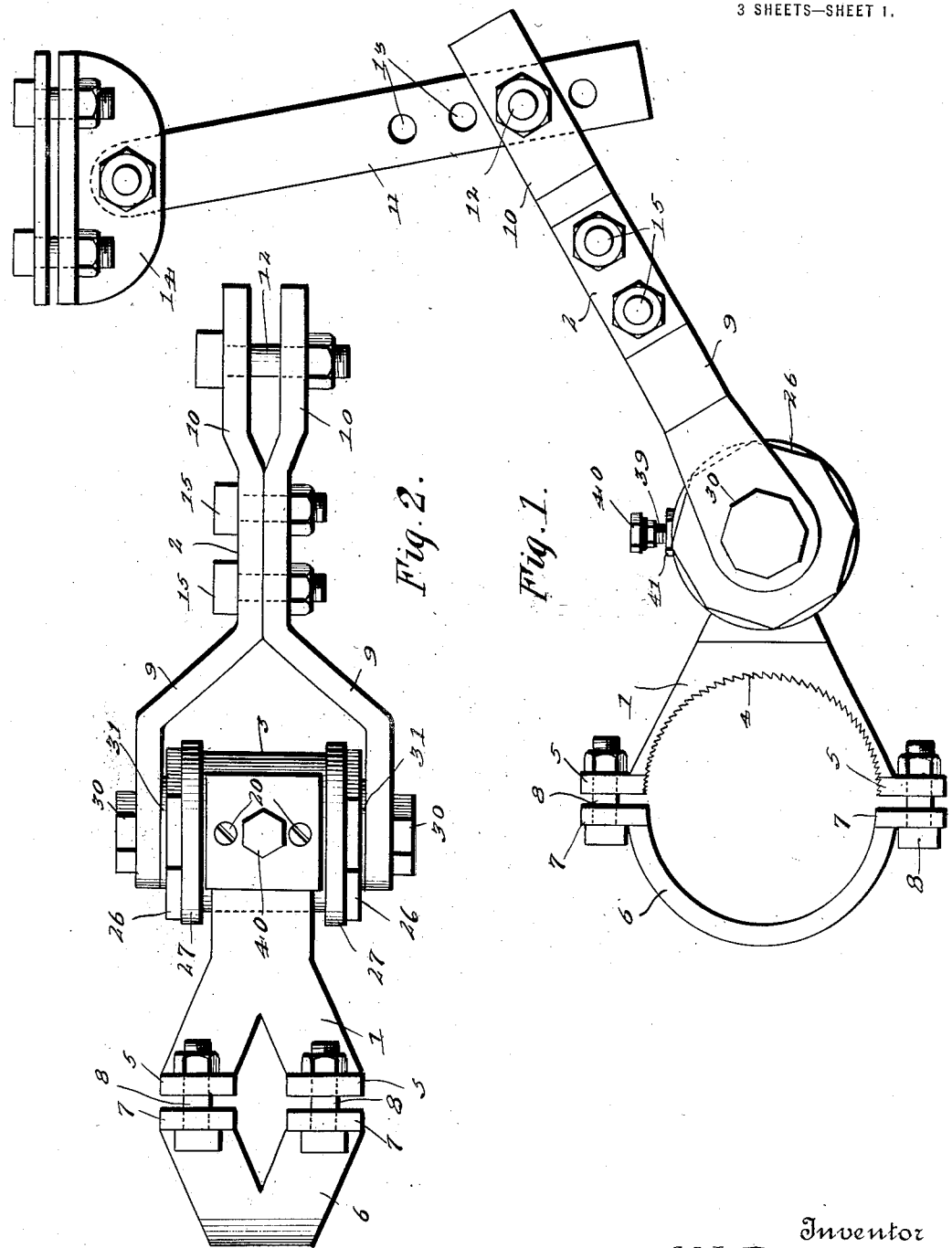

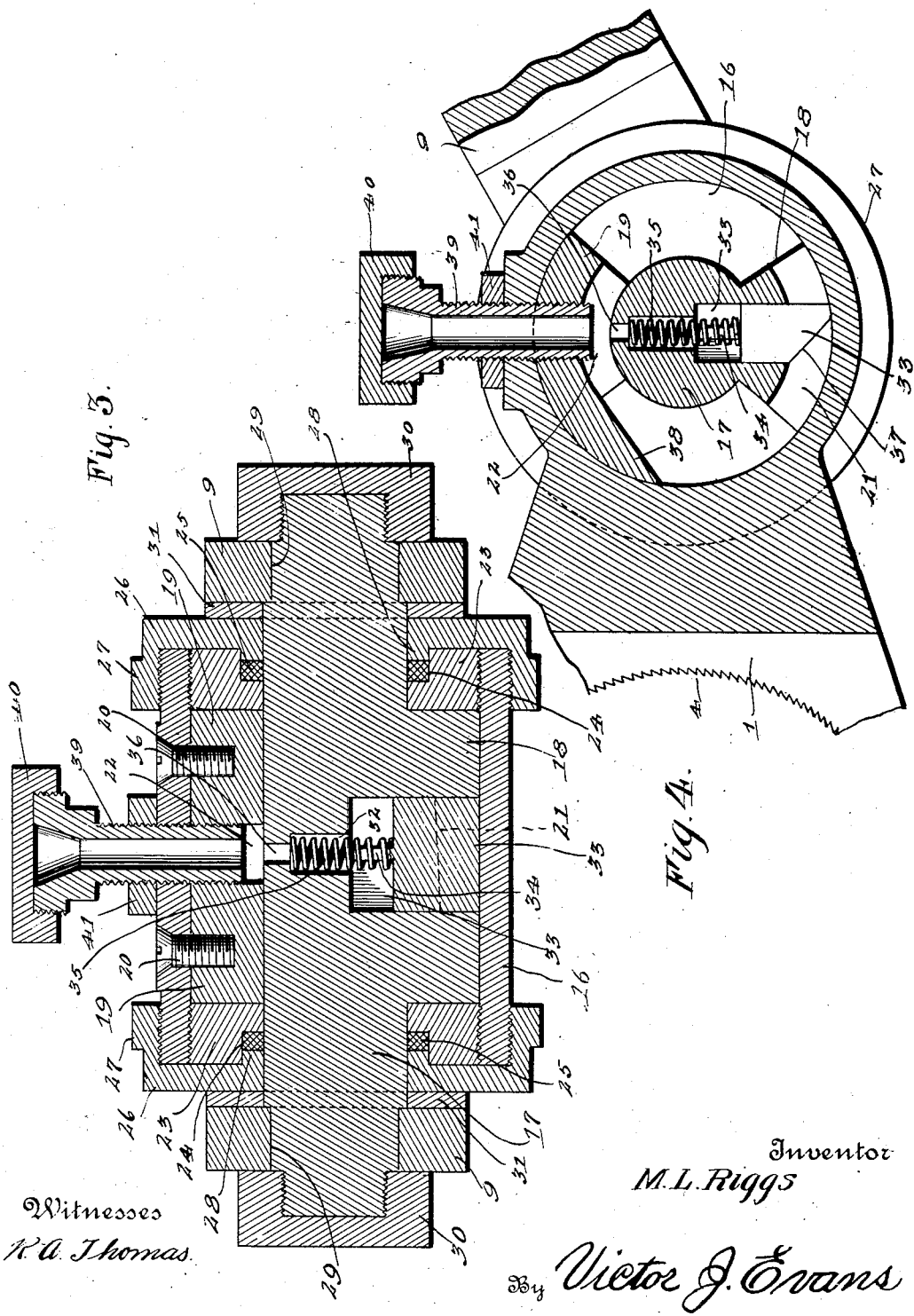

UNITED STATES PATENT OFFICE.

MARION L. RIGGS, OF BERTHA, MINNESOTA.

VEHICLE-SPRING.

1,350,942.  Specification of Letters Patent.  Patented Aug. 24, 1920.

Application filed January 21, 1919. Serial No. 272,299.

*To all whom it may concern:*

Be it known that I, MARION L. RIGGS, a citizen of the United States, residing at Bertha, in the county of Todd and State of Minnesota, have invented new and useful Improvements in Vehicle-Springs, of which the following is a specification.

This invention relates to a novel construction of shock absorber for automobiles and other vehicles for absorbing the shocks incident to the compressive and reaction movements of the spring.

The invention is designed to relieve the springs of the vehicle from some of the strain and jar and is independent of said springs, being connected with the axle and the body of the vehicle.

The device is of the fluid type and comprises a cylinder containing a rotary abutment for compressing the fluid in the cylinder between itself and a stationary abutment, said abutments having restricted passages therein, with means for adjusting the size of the passage in the stationary abutment and a sliding valve for controlling the passage in the other abutment.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the device.

Fig. 2 is a side view thereof.

Fig. 3 is a longitudinal section through the cylinder and associated parts.

Fig. 4 is a cross section on line 4—4 of Fig. 1.

Fig. 5 is a view of one of the locking rings.

Fig. 6 is a view of one of the cover plates.

Fig. 7 is an end view with the arm and its nut removed.

As shown in these views, the invention consists of an arm 1 which is adapted to be connected with the axle and an arm 2 adapted to be connected with the body of the car, said arms being connected together by the fluid container 3. The arm 1 is formed with a semi-circular recess 4 and flanges 5 and a cap 6 of semi-circular form, and provided with the flanges 7 for clamping said arm to the axle housing or the axle itself. The cap is held in place on the arm by the bolts 8 passing through the flanges. The arm 2 is provided with a large fork 9 at one end and a small fork 10 at its other end, which is adapted to receive the link 11, the link being adjustably connected to said arm by means of the bolt 12 and the holes 13. The upper end of the link is secured to the bottom of the body of the automobile by means of the clamp 14. The arm 2 is formed of two parts clamped together by the bolts 15. The arm 1 is formed integral with the cylinder 16 of the fluid container, and a shaft 17 passes through said cylinder and is connected with the large fork 9 of the arm 2. The shaft carries an abutment 18, which forms a piston in the cylinder, and a stationary abutment 19 is secured to the inner walls of the cylinder by the bolts 20. These abutments extend longitudinally and are provided centrally with the ports 21 and 22. The ends of the cylinder are closed and the parts held in proper position by means of a pair of locking rings 23, one of these rings being located in each end of the cylinder, said cylinder and rings being screw-threaded, as shown. The rings abut against the abutments and have their inner circumferences engaging the shaft. A groove 24 is formed in the outer face of each ring to receive the packing material 25. Cover plates 26 are provided with the outer flanges 27, which have their inner faces screw-threaded to engage the screw-threads on the outer circumference of the ends of the cylinders. The cover plates are also provided with the small inner flanges 28, which project into the grooves 24 and compress the packing 25. The shaft is provided with a small reduced portion 29 to receive the openings formed in the ends of the large fork 9 and said arms are removably held in place by means of the caps 30 which engage the screw-threaded ends of the shaft. I place washers 31 between the cover plates and the ends of the fork. The shaft is provided with a central opening 32 of varying sizes. The largest part of which forms a recess 33 of rectangular shape, which is extended through the abutment 18 and communicates with the port 21. A sliding valve 33 engages with this recess. This valve has a stem 34 which is adapted to engage with the central part of the opening 32 when the valve is pushed inwardly. A coil spring 35 is located in said central part of the opening and engages with said stem. The small part 36 of the opening communicates with the port 22 in the stationary abutment in certain positions of the parts. The valve 33 is provided with an inclined part 37 on one side of its end while its other side is straight. The extreme end of the valve is rounded to engage the walls of the cylinder. The abutment is provided with an extension 38 at one side thereof which is adapted to engage and close the port 21 in the rotary abutment in a certain position of the parts. The cylinder is filled by means of a screw-threaded plug 39, which passes through the upper part of the cylinder and has its end extending into the port 22. This end is of the same diameter as the width of the port and acts as an adjuster means for adjusting the size of said port. The upper end of the plug is screw-threaded and receives a cover 40. The plug is held in adjusted position by the lock nut 41.

It will thus be seen that when the axle and the body move toward each other the rotary abutment will be moved toward the left or toward the extension 38 of the stationary abutment. The fluid will flow in an opposite direction through the ports 21 and 22, the valve 33 moving inwardly due to the pressure on the inclined face 37. The extension 38 will engage the port 21 if the movement should be great and thus check the movement and so save the springs from an excessive strain. On the rebound, the valve will prevent the fluid from passing through the port 21, so that it must all pass through the restricted port 22. Thus the rebound movement is checked.

I prefer to make the parts 29 of the axle of octagon shape and to make the openings in the ends of the fork 9 of like shape. In this way, by changing the position of the fork on the shaft the device can be adjusted to suit different conditions.

I prefer to place the clamp 14 at a point quite a distance in advance of the rear axle and to clamp the arm 1 to the housing of said rear axle. Thus the device will absorb a certain part of the jar administered to the front springs, so that it is necessary to use but two of the absorbers. It will be seen that the working parts are extremely simple and automatic in their operation, thus requiring the minimum amount of care and attention. All working parts operate in oil, and due to the locking rings and cover plates the device is dustproof, thereby doing away with the necessity of frequent oiling and there is no danger of sand and dust getting into the bearings. All the adjustments are made from the exterior so that it is not necessary to take the device apart. As before stated, the extension on the stationary abutment engaging with the port in the rotary abutment permits the device to assume a part of the load when the spring is being taxed to its utmost in the downward movement of the parts.

It is thought from the foregoing description that the advantages and novel features of my invention will be readily apparent.

I desire it to be understood that I may make changes in the construction and in the combination and arrangement of the several parts, provided such changes fall within the scope of the appended claims.

What I claim is:—

1. A device of the class described, comprising a cylinder containing a fluid, a stationary abutment therein, a shaft in said cylinder, an abutment carried thereby, said abutments having restricted passages therein, a valve controlling the passage in the shaft abutment, a screw-threaded filling plug carried by the cylinder and acting as an adjusting means for the passage in the stationary abutment and arms connected with the shaft and cylinder.

2. A device of the class described, comprising a cylinder containing a fluid, a stationary abutment therein, an extension on said stationary abutment, a shaft in said cylinder, an abutment carried thereby, said abutments having restricted passages therein, the passage in the shaft abutment engaging with the extension to limit the movements of the parts, a valve controlling the passage in the shaft abutment and having one of its edges inclined and adapted to engage with the extension, means for adjusting the size of the passage in the stationary abutment and arms connected with the shaft and cylinder.

3. A device of the class described comprising a cylinder containing a fluid, a stationary abutment therein, a shaft in said cylinder, an abutment carried thereby, said abutments having restricted passages therein and the shaft and its abutment having a transverse opening therein, a spring controlled slide valve in the casing for controlling the passage in the abutment, means for adjusting the size of the passage in the stationary abutment and arms connected with the shaft and cylinder.

4. A device of the class described comprising a cylinder, closing rings at the ends thereof, a shaft passing through said cylinder and rings, an abutment carried by the cylinder, an abutment carried by the shaft, said abutments having restricted passages therein, a valve controlling the passage of the shaft abutment, each end ring having an annular groove in its inner periphery, a packing in said groove engaging the shaft, cover plates having screw threaded engagement with the ends of the cylinder and having inner flanges for engaging the packing, an arm connected with the ends of the shaft and an arm connected with the cylinder.

In testimony whereof I affix my signature.

MARION L. RIGGS.